(12) United States Patent
Landfield

(10) Patent No.: US 7,680,880 B2
(45) Date of Patent: Mar. 16, 2010

(54) SYSTEM AND METHOD FOR PROTECTING A COMPUTER NETWORK

(75) Inventor: Kent B. Landfield, Grapevine, TX (US)

(73) Assignee: McAfee, Inc., Santa Clara, CA (US)

( * ) Notice: Subject to any disclaimer, the term of this patent is extended or adjusted under 35 U.S.C. 154(b) by 943 days.

(21) Appl. No.: 11/410,730

(22) Filed: Apr. 25, 2006

(65) Prior Publication Data

US 2007/0250595 A1    Oct. 25, 2007

(51) Int. Cl.
*G06F 15/16* (2006.01)

(52) U.S. Cl. .................. 709/203; 709/218; 709/220; 370/254; 713/1

(58) Field of Classification Search ........... 709/203, 709/218, 220; 370/254; 713/1
See application file for complete search history.

(56) References Cited

U.S. PATENT DOCUMENTS

2005/0091542 A1*   4/2005   Banzhof ................. 713/201
2006/0080653 A1*   4/2006   Siwatu et al. ............ 717/173
2006/0206757 A1*   9/2006   Russell et al. ............. 714/9

* cited by examiner

*Primary Examiner*—Thu Ha T Nguyen
(74) *Attorney, Agent, or Firm*—Zilka-Kotab, PC (57) ABSTRACT

A system for protecting a computer network from vulnerabilities can be provided that generally includes a remedy and patch server located at a client site and adapted to receive a global remedy package and a global patch package. The global remedy package may include at least one remedy and the global patch package may include at least one patch. At least one remedy and optionally at least one patch can repair a vulnerability in the computer network. The system can further include at least one local remedy server adapted to communicate with the remedy and patch server for receiving at least one remedy. At least one local patch server may be adapted to communicate with the remedy and patch server to receive at least one patch. The system also generally includes a local computer system adapted to communicate, independently, with the at least one local remedy server and at least one local patch server for receiving, respectively, at least one remedy and optionally at least one patch.

17 Claims, 7 Drawing Sheets

SYSTEM AND METHOD FOR PROTECTING A COMPUTER NETWORK

CROSS-REFERENCE TO RELATED APPLICATIONS

This application includes subject matter similar to U.S. Patent Publication 2003/0126472; U.S. patent application Ser. No. 10/810,927 to Banzhof et al. filed Mar. 25, 2004 and entitled "Method And Apparatus For Protecting A Remediated Computer Network From Entry Of A Vulnerable Computer System Thereinto"; U.S. patent application Ser. No. 10/975,828, to Banzhof et al. filed Oct. 28, 2004 and entitled "Inventory Management-Based Computer Vulnerability Resolution System"; and U.S. patent application Ser. No. 11/062,409, to Banzhof et al. filed Feb. 22, 2005 and entitled "Security Risk Analysis System and Method", all of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a system for protecting a computer network, and more particularly, but not by way of limitation, to a system or method of obtaining and implementing remediations to protect a computer network from vulnerabilities.

BACKGROUND OF THE INVENTION

Each year, computer systems face degradation due to vulnerabilities. For example, it has become quite difficult for a network security administrator to maintain an accurate inventory of hardware and, in particular, software programs residing on each computer system that form part of a computer network. Indeed, only minutes are needed for a user to download new software programs onto a computer system from the Internet. With each new piece of hardware or software added to a computer system, another potential vulnerability from which the computer network must be protected is created. However, the network security administrator may not even be aware of the need to remediate the computer network to address a newly discovered vulnerability in a particular piece of computer hardware or software if the network security administrator erroneously believes that the hardware or software is not installed within any of the computer systems forming the computer network.

In order for the network security administrator to remediate the vulnerabilities, the network security administrator must typically expend a large amount of labor and resources to identify vulnerabilities. Additional labor is then required to install a patch, a remedy or otherwise resolve or bypass the identified vulnerabilities. Oftentimes, this involves the network security administrator visiting each affected computer system and manually applying the necessary remediation.

SUMMARY OF THE INVENTION

One exemplary system for protecting a computer network from vulnerabilities can include a remedy and patch server located at a client site and adapted to receive a global remedy package and a global patch package. The global remedy package may include at least one remedy and the global patch package may include at least one patch. Desirably, at least one remedy and optionally at least one patch can repair a vulnerability in the computer network. The system can further include at least one local remedy server adapted to communicate with the remedy and patch server for receiving at least one remedy, at least one local patch server adapted to communicate with the remedy and patch server to receive at least one patch, and a local computer system adapted to communicate, independently, with the at least one local remedy server and at least one local patch server for receiving, respectively, at least one remedy and optionally at least one patch.

Another exemplary system for protecting a computer network from vulnerabilities can include a storage unit at a client site in communication with a local computer system. The storage unit may include a remedy repository for receiving data from a global remedy package, in turn, including at least one remedy to repair a vulnerability in the computer network and obtained via the Internet from a primary provider, and a patch repository for receiving data from a global patch package, in turn, comprising at least one patch to repair a vulnerability in the computer network and obtained via the Internet from at least one secondary provider. Generally, the packages are requested at the client site for transfer of at least one remedy and optionally at least one patch to the local computer system to repair a vulnerability.

One exemplary method of downloading data can include generating remedies at a primary provider to repair vulnerabilities in a computer network and combining the remedies into a global remedy package, generating patches at a secondary provider to repair vulnerabilities in the computer network and combining the patches into a global patch package, and sending the global remedy package and the global patch package upon request by a client to a remedy and patch server. Also, the global remedy package may include remedy data, patch validation data, and association data of a remedy to at least one vulnerability.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

In the detailed description and claims which follow, certain terms are used to refer to particular system components. As one skilled in the art will appreciate, components may be referred to by different names. Accordingly, this document does not intend to distinguish between components that differ in name, but not function.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "vulnerability" generally refers to any hardware, software or firmware weakness or design deficiency that leaves a computer system open to assault, harm, or unauthorized exploitation, either externally or internally, thereby resulting in a risk of information compromise, information alteration, service denial, or other unauthorized alteration of the computer system.

The terms "remediate" and "remediation" generally refer to addressing or resolving vulnerabilities by taking a series of steps or actions to reduce, eliminate, limit, or otherwise alleviate the security risk presented by the subject vulnerabilities.

The term "remedy" generally refers to a list of actions taken to address or resolve a vulnerability, and can include: service pack, hot fix and patch installations, service management, registry management, security permissions management, account management, policy management, audit management, file management, and process management. These types of remedies are generally known in the computer security industry.

The term "patch" generally refers to program code that supplements or replaces code in a program to cure a defect or upgrade the program in light of its current operating environment.

The term "global" generally defines information or data being or originating outside a client site and can be obtained via, e.g. the Internet.

The term "local" generally refers to information or data being or originating at a client site.

The term "data transfer media" or "a means for physically transferring data" generally refers to media that can receive and transfer digital information, and includes writable and nonwritable CDs and DVDs, diskettes, ZIP drives, and USB drives.

The term "primary provider" generally refers to an entity that supplies digital information, including remedies, and optionally services, to a client.

The term "secondary provider" generally refers to an entity that supplies digital information, including patches, and optionally services, to a client.

The term "client" generally refers to an entity that receives digital information and the optional services related to the digital information from a provider.

The term "local remedy server" generally refers to a server at a client site that receives and disseminates remedies.

The term "local patch server" generally refers to a server at a client site that receives and disseminates patches, and can download from the Internet or from a data transfer media, e.g., a CD or a DVD.

The term "remedy and patch server" generally refers to a server at a client site that receives, archives, and disseminates patch data and remedy data.

The term "mirrored configuration" generally refers to replicating data, e.g. global remedy and patch data, from a first server being copied onto a second server, or onto a data transfer media.

Definitions for certain other words and phrases may be provided throughout this document. Those of ordinary skill in the art should understand that in many, if not most instances, such definitions apply to prior, as well as future uses of such defined words and phrases.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The system can provide a first server at a client site for receiving patch data from a secondary provider and remedy data from a primary provider. This first server, in turn, can distribute a remedy to local remedy server and a patch to a local patch server, which are subsequently distributed to a local computer system. Also, the first server can be adapted to be in a mirrored configuration with other servers for distribution of remedy and patch data to a series of local computer systems. In addition, the first server can mirror or replicate the remedy and patch data onto a data transfer media for copying information across an "air gap", such as where there is no communications between systems, and into a secured system, which has one or more servers for distributing remedy and patch data.

Particularly, a tiered architecture that can provide a mirrored configuration of servers is advantageous should a client have bandwidth, geographic, organizational, or air-gap requirements. As an example, some clients have bandwidth limitations on some devices for receiving remedy and patch data. By having a dedicated remedy and patch server, a single internet connection can be dedicated and upgraded to receive the remedy and patch data. Also, some clients are spread across different buildings, or even cities and states. In such an instance, placing a remedy and patch server at each site can serve to provide updates for removing vulnerabilities at each office. In addition, some organizations are sub-divided into different business or operating groups. Again, a tiered architecture is advantageous by minimizing the number of internet connections while automating the process of providing remedies and patches to various groups in the organization. Also, some clients require networks in a secure environment. The ability to provide remedy and patch packages onto a data transfer media can bridge the "air gap" between secure and global systems.

Moreover, the present embodiments as disclosed below permit the automated transfer of updates by network connections, while minimizing a client's network exposure to the Internet by limiting the number of internet connections and permitting the transference of data to a secured system. This minimization of connections aids in preventing the unwanted intrusion of hackers and the inadvertent releasing of sensitive client information, while permitting the balancing of internal network traffic. In addition, the minimization of network connections reduces the costs of providing security measures, such as firewalls. Moreover, the present disclosure can provide current global remedy packages and global patch packages, including for non-Internet connected sites. In addition, the system can reduce the number of sites requiring bandwidth capability, increase the speed of the availability of remediations throughout the organization regardless of size, and minimize the human involvement to reduce staffing costs and errors. In one desired embodiment, the system can provide a means for a client to pre-test and approve patches prior to making them available for client use and can integrate client alerts into the remedy and patch server. Thus, the system can offer better control and management of remedy and patch data across large and disconnected networks by, e.g., providing tracking and reporting of remedies, patch delivery and testing, while lowering administrative effort in managing the replication of the global remedy package and global patch package.

Figure 1:
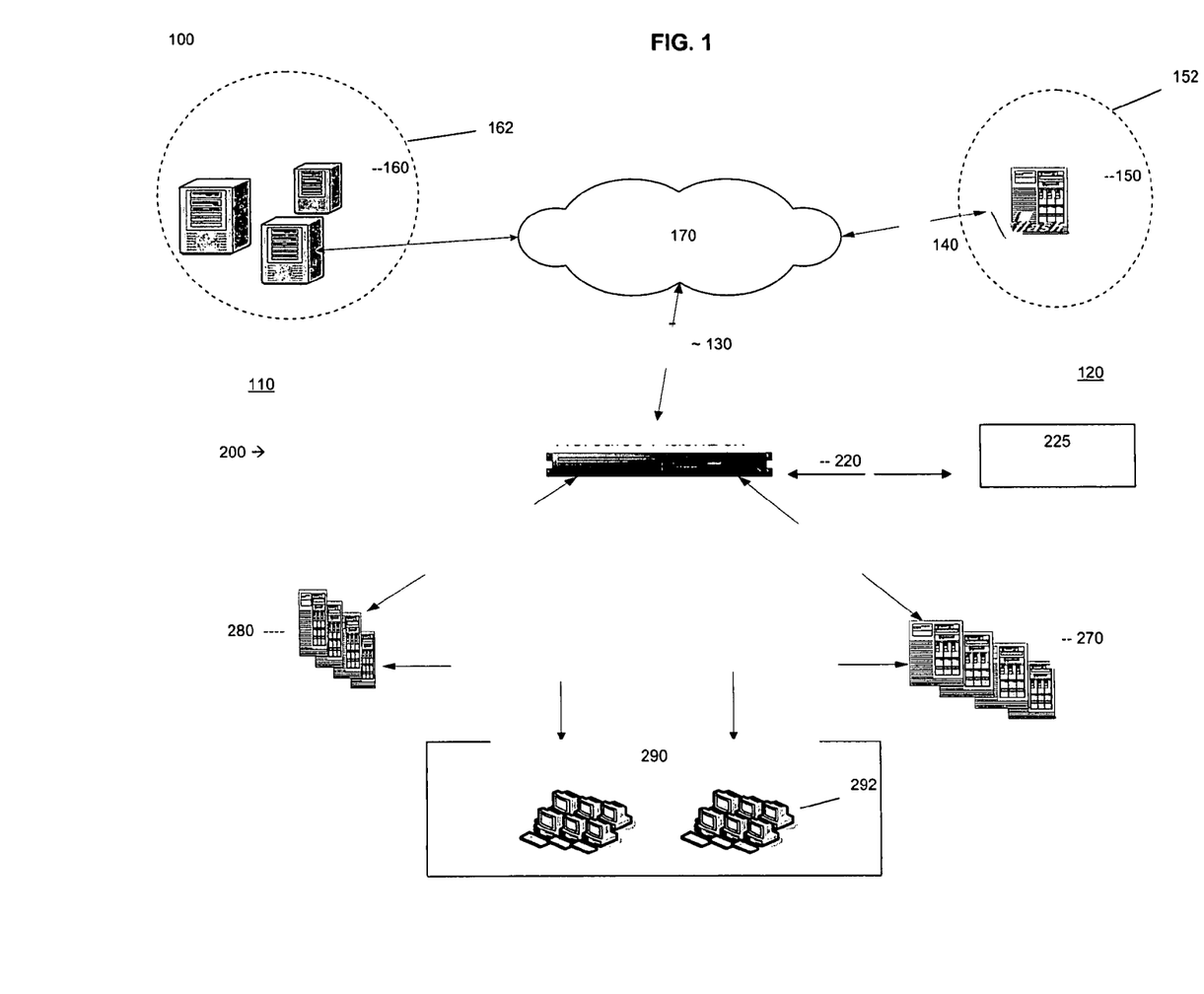
FIG. 1 is a schematic depiction of one exemplary embodiment of a system for protecting a computer network.

One exemplary embodiment of a system 100 for protecting a computer network 110 from vulnerabilities is depicted in FIG. 1. The system 100 can include a primary provider server 150 at the site of a primary provider 152, a secondary provider server 160 at the site of a secondary provider 162, and a remedy and patch server 220. A remedy and patch server 220 communicates with the primary provider server 150 and the secondary provider server 160 by a connection 130, such as via the Internet 170. A communication link 140 between primary provider server 150 and the remedy and patch server 220 can be encrypted using any known commercially available protocol, such as secure sockets layer (SSL). Moreover, the connection 130 typically can be the sole communication link to resources outside a client site 120. As such, this link can be protected from unwanted intrusions by applying the appropriate defensive measures, e.g., firewalls, antivirus software, and antispyware software, at a single link rather than multiple links spread across the client site 120. This single point access helps minimize unwanted intrusions, the inadvertent downloading of viruses, or the accidental release of information, as discussed above.

The primary provider 152 can supply a variety of software or services to the client. As an example, the primary provider 152 may supply software products and services to mitigate the risk of security vulnerabilities, such as by neutralizing security vulnerabilities through automated vulnerability remediation (AVR) technology. Thus, the primary provider 152 can identify new and emerging vulnerabilities and provide corrective actions to fix the discovered vulnerabilities. When new vulnerabilities are discovered, the primary provider 152 may research the issue, develop a remedy, and then extensively test it before making the remedy available to a client.

The secondary provider 162 supplies software products and optionally services to a client. These software products may be business application programs, e.g. MICROSOFT WORD® or ADOBE ACROBAT® software for personal computers or network software from providers such as SUN MICROSYSTEMS. So although only one secondary provider 162 is depicted, it should be understood that typically the remedy and patch server 220 will communicate with numerous secondary providers to obtain patches or updates to the software programs residing on a client's computer network 110.

The remedy and patch server 220 may be a standalone device or security appliance with its own power supply for the management and creation of remediation media for use within the globally connected and secured systems, as discussed in more detail hereinafter. As an example, the server 220 can be a personal computer or laptop. Alternatively, the server 220 can be a VMWare image supported on a blade device, and thus run on a single blade within an existing blade chassis. In some embodiments, the functions of the server 220 can be replaced with a software implementation.

The server 220 may also include full auditing of actions, including configuration changes, restricted user/administrator access, including the servers management, and reporting capabilities allowing administrators to monitor the usage of the system, including their own usage.

The server 220 can be configured with an internet protocol access list constraints for both browser-based access as well as internal client-based sites. Generally, this capability allows total control over which addresses that can contact the server 220 for general usage using the Web interface or for the mirroring process, as described hereinafter. This limited access may allow a client the ability to restrict who can connect to the server 220 without prior coordination. This can be a configurable feature so a client has the option of enabling this feature. The remedy and patch servers discussed below, including those in systems 300 and 500, can be generally the same as the server 220.

The remedy and patch server 220 can, in turn, communicate with at least one local remedy server 270, which in this depicted embodiment there are four servers 270, and with at least one local patch server 280, which in this depicted embodiment there are four servers 280. The local remedy server 270 receives remedies and the local patch server 280 receives patches from the remedy and patch server 220. Generally, the local remedy server 270 only receives remedies and the local patch server 280 only receives patches. The servers 270 and 280, in turn, communicate with a local computer system 290, which can include at least one computer 292, including optionally additional servers. Generally, the local computer system 290 is several computers linked via a network and having access to, optionally shared, peripheral devices, e.g. printers. The local computer systems discussed below, including those in systems 300 and 500, are generally similar to the system 290.

The local remedy server 270 can be supplied, directly or indirectly, by the primary provider 152 to facilitate the application of remedies and other products originating from the primary provider 152. Desirably, the local remedy server 270 can provide vulnerability remediation actions and policy enforcement to the local computer system 290. In one instance, the local remedy server 270 can include one or more software packages to provide a comprehensive solution for vulnerability management, security compliance and automated remediation, compliance audits, asset inventory and security risk assessment, vulnerability remediation, endpoint security and enterprise-wide reporting. The local remedy server 270 can further include software to implement proactive risk management strategies to protect from financial loss. The local remedy server 270 can allow a client to assess compliance and to correct the problems found, either via scanning with a secondary provider's scanner or by using the capabilities of the local remedy server 270. Generally, the local remedy server 270 can address these classes of vulnerabilities: unsecured accounts, e.g., null password, no administration password, and no password expiration; unnecessary services; backdoors, e.g. spyware; mis-configurations, e.g., netbios shares, and anonymous FTP world read/write; and software defects, e.g., missing patches and buffer overruns. The local remedy servers discussed below, including those in systems 300 and 500, can be generally the same as the local remedy server 270.

The local patch server 280 can retrieve all patches from the remedy and patch server 220, via a network connection, eliminating the requirement of receiving patches written on a medium, e.g. CD or DVD. Particularly, some servers 280 may not be adapted to receive data in the form of, e.g. a CD. Moreover, some patches are excessive in size and do not readily fit on media, such as CDs. Additionally, supplying patches via a network connection removes the need for human interaction, i.e. there is no need for staff to generate the global patch package 240 (see FIGS. 5 and 6) and save to a media, and then walk that media over to the local patch server 280 and import it. This can be a time consuming process that burdens the client's administrator with additional work. Replicating the global patch package 240 over the network 110 greatly reduces the amount of time users need to wait for patches to become available for their remediation environment. This feature also facilitates the use of testing and approval features optionally included in the global patch package 240. The local patch servers discussed below, including those in systems 300 and 500, can be generally the same as the local patch server 280.

Thus, the servers 220, 270 and 280, and the local computer system 290 are part of a globally connected system 200. Generally, these devices share a common communications line or wireless link, e.g. local area network (LAN) that permits direct or indirect communication among them.

Figure 5:
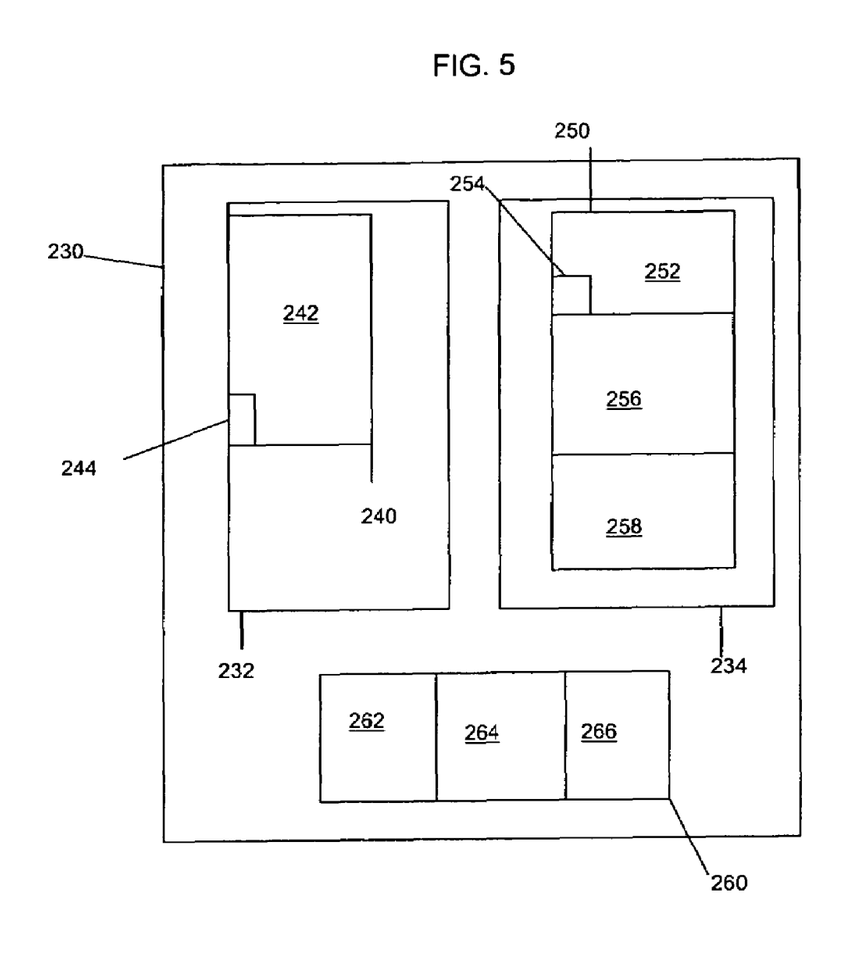
FIG. 5 is a schematic depiction of a storage unit of the system.

A storage unit 230 of the present system 100 is depicted in FIG. 5. The storage unit 230 can be incorporated into the remedy and patch server 220. At least some of the information contained in the storage unit 230 can replicated or mirrored onto other servers or media, as hereinafter described. The storage unit 230 can be incorporated into the servers discussed below, including the remedy and patch servers in systems 300 and 500.

The storage unit 230 can include a patch repository 232 for receiving a global patch package 240, a remedy repository 234 for receiving a global remedy package 250, and optionally a custom repository 260. The package 240 can contain patch data 242, including one or more patches and be obtained from the secondary provider server 160. Optionally, the package 240 can include other data as well. A patch 244 can be used to upgrade or fix a defect in a secondary server provider's software program and the package 240 may be downloaded from the secondary provider server 160. Generally, the patch repository 232 contains a copy of all patches required by the remedies published by the primary provider 152. Generally, the patch data 242 in the package 240 is archived in the repository 232 on the remedy and patch server 220 to provide access to all patches required by a remedy 254 obtained from the primary provider 152. When patches are needed, the server 220 can connect to the secondary provider server 160, can retrieve patches and store them in the repository 232, which can subsequently be disseminated by a request from the local remedy server 270 for that patch 244 or for use in generating offline media.

Generally, the remedy repository 234 receives remedies and optionally other data from the package 250, which can contain remedy data 252, including one or more remedies, patch validation data 256, and association data 258 that includes associating a remedy to at least one vulnerability, and optionally to one or more patches. It should be understood that other data can also be included, such as prioritization data from the primary provider 152.

In one desired embodiment, the global packages 240 and 250 contain all information from previous updates. In other words, the packages 240 and 250 do not contain just the changes from previous updates. Rather, the packages 240 and 250 contain information from all the previous updates as well. In an alternative embodiment, the packages 240 and 250 contain information pertaining to the most recent published update. The data contained in the packages 240 and 250 may be obtained outside the client site 120 at the client's request. Thus, once the packages 240 and 250 are downloaded and optionally approved, the data in the repositories 232 and 234 can be updated with data from respective packages 240 and 250.

Generally, the remedy package 250 contains one or more remedies published by the primary provider 152 to remediate a vulnerability in the network 110. Particularly, the remedies can be for the versions of programs deployed by a client on its network 110. Furthermore, the package 250 generally contains association data 258 including a correlation of tying a network vulnerability to the appropriate remedy or remedies, as well as the appropriate patches, as applicable. Particularly, the package 250 may contain information with the uniform resource locators (URLs) of the one or more patches associated with the one or more remedies in the package 250. If the URLs are from more than one secondary provider 162, then the package can receive a global patch package 240 from each secondary provider 162.

The package 250 may also contain patch validation data 256 that can utilize SHA256 checksum algorithms to confirm that patches and/or remedies obtained by a client match patches and/or remedies generated by that provider. In one desired embodiment, the repositories 232 and 234 generate SHA256 checksums that can be validated against the publicly published SHA256 signatures, i.e. a listing, of the primary provider 152. Desirably, this listing is published daily to provide updates to the client. This validation may provide the client with the capability to check the integrity of the downloaded patches and the remedies.

Generally, the custom repository 260 contains data generated at the client site 120. As an example, the testing approval data 262 may contain the test results of patches and remedies loaded onto the remedy and patch server 220 that are subjected to evaluation at a testing facility 225 located at the client site 120. Generally, testing is a desired part of any vulnerability management process. Historically, certain patches have been known to cause problems with existing applications. One way to assure that this is not the case with future patches is to create a test network that consists of the client's local applications and apply the individual patches and remedies to assure that there is no adverse effect. Particularly, a patch 244 or a remedy 254 can be tested for compatibility with a business application software program utilized at a single machine or department, or a general network or computer application. The test tracking on an individual patch 244 and remedy 254 can be stored in the testing data 264. This feature can be configurable feature enabled or disabled at the desire of the client. Once the patch 244 or remedy 254 is deemed compatible, the testing data 264 can be stored on the remedy and patch server 220, as well as the approval 262, such as the appropriate personnel's authorization, for installation on other machines in the network 110. These testing features can provide better control and management, as discussed above.

Moreover, a remediation protocol developed at a local business group or machine can be stored as testing data 264, and subsequently evaluated at the testing facility 225. Once the remediation protocol is approved for installation at other locations in the network 110, the approval 262 along with the remediation protocol can be stored in the custom repository 260 to authenticate future installations. Also, a client may have internal vulnerability alerts generated at, e.g., a local computer system 290. These alerts can be stored in the custom repository 260, and subsequently transmitted to the primary provider 152 to generate a custom remedy 254 for the client. This custom remedy 254 can then be transmitted to the client and stored in the custom repository 260 or remedy repository 234 for application in one or more local computer systems 290. Alternatively, the client may build and store a custom remedy 254 in the custom repository 260 in response to an internal vulnerability alert. The custom repository 260 may optionally contain prioritization data 266 regarding the priority of installing patches and remedies in the network 110. Such prioritization may be developed at the client site 110, recommended by the testing facility 225, or developed by the primary provider 152.

Figure 2:
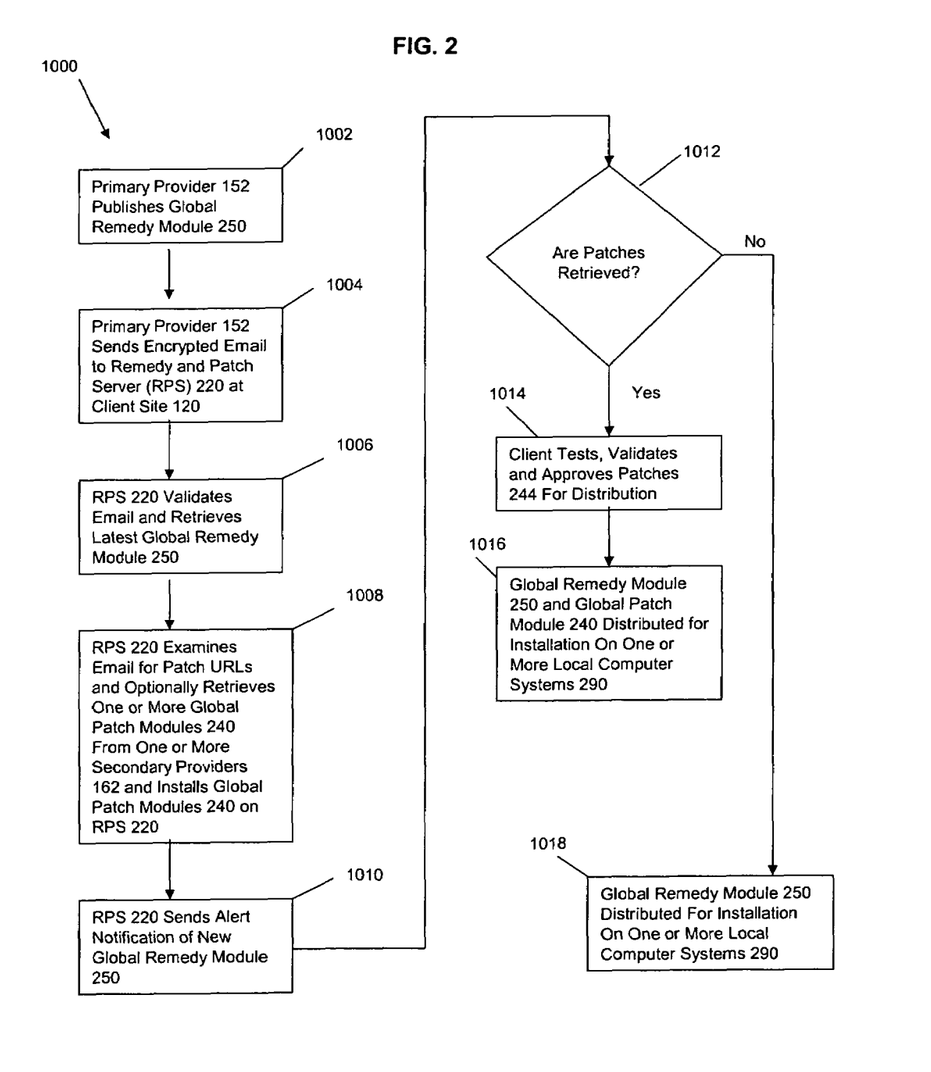
FIG. 2 is a block flow diagram of a mode of operation for retrieving and distributing global remedy packages and global remedy patches.

As depicted in FIG. 2, one mode of operation 1000 of the system 100 is depicted. In the first block 1002, the primary provider 152 publishes the global remedy package 250. Next at the block 1004, the primary provider 152 sends an encrypted email to a remedy and patch server 220 at the client site 120. That being done, the remedy and patch server 220 validates the email and retrieves the latest global remedy package 250, at the block 1006. Afterwards, the remedy and patch server 220 examines the email for the URLs of any patches associated with the remedies in the package 250. If so, the remedy and patch server 220 retrieves one or more global patch packages 240 from one or more secondary providers 162 and installs the global patch packages 240 on the remedy and patch server 220, at the block 1008.

The remedy and patch server 220 sends an alert notification to the client of the new global remedy package 250, at the block 1010. At this point, the client can inquire if any patches are associated with the remedies in the package 250, at the block 1012. If so, the client can test, validate, and approve patches for installation on the network 110, at the block 1014. In some embodiments clients may also choose to test remedies which do not incorporate patches prior to approval for distribution of the remedies. The packages 240 and 250 can be distributed for installation on one or more local computer systems 290, at the block 1016. On the other hand, if the global remedy package 250 is not associated with any patches, the global remedy package 250 can be distributed for installation on one or more local networks 290, at the block 1018. Alternatively, the global remedy package 250 can be immediately disseminated to the local remedy server 270 after downloading to the server 220.

Figure 3:
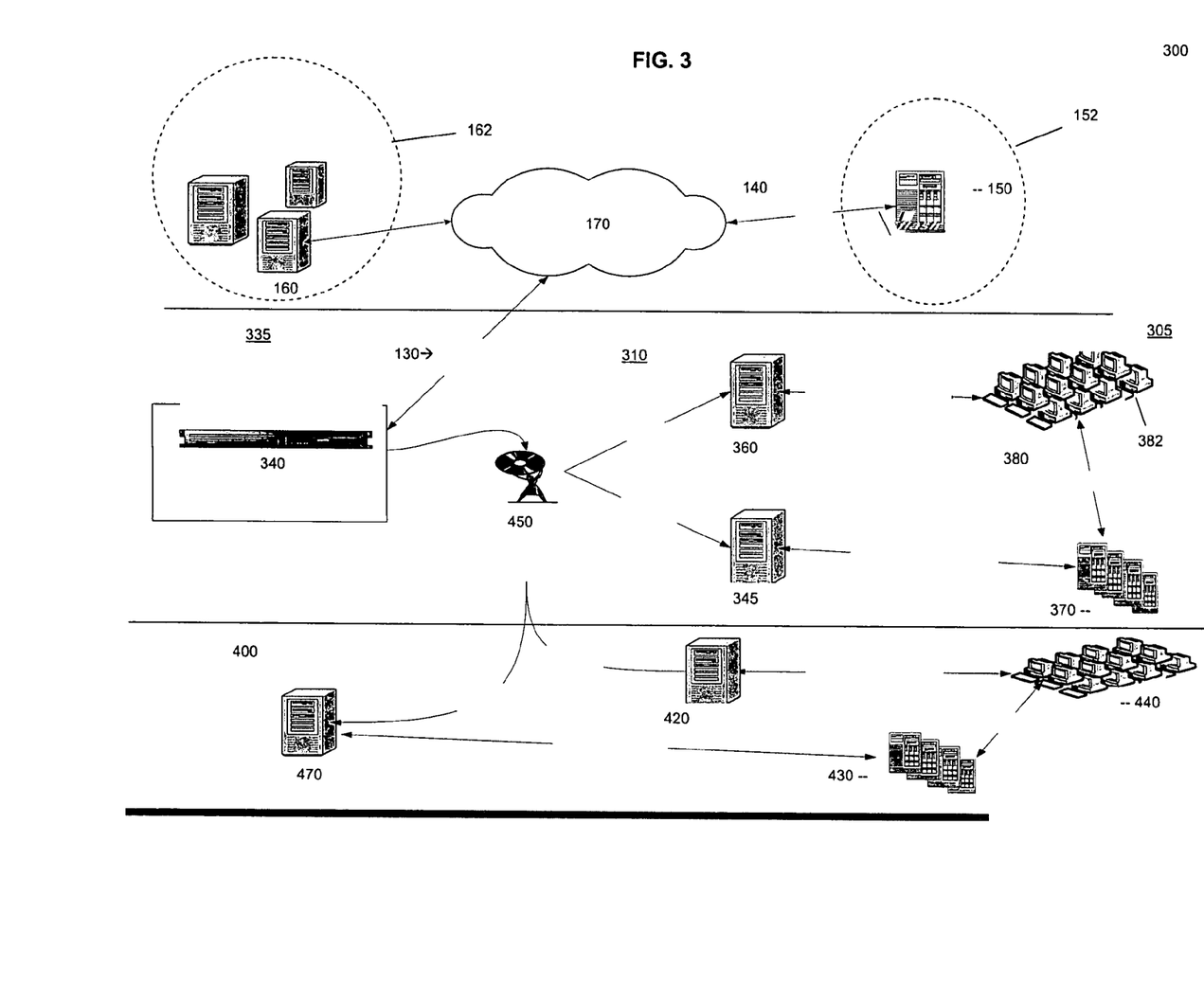
FIG. 3 is a schematic depiction of another exemplary embodiment of a system for protecting a computer network.

Another exemplary embodiment of a system 300 for protecting a computer network 305 from vulnerabilities is depicted in FIG. 3. The system 300 can include the primary provider server 150, the secondary provider server 160, and a remedy and a patch server 340. The remedy and patch server 340 may be similar to the remedy and patch server 220 illustrated in FIG. 1, and can communicate with the primary provider server 150 and the secondary provider server 160, as described for the system 100.

Figure 6:
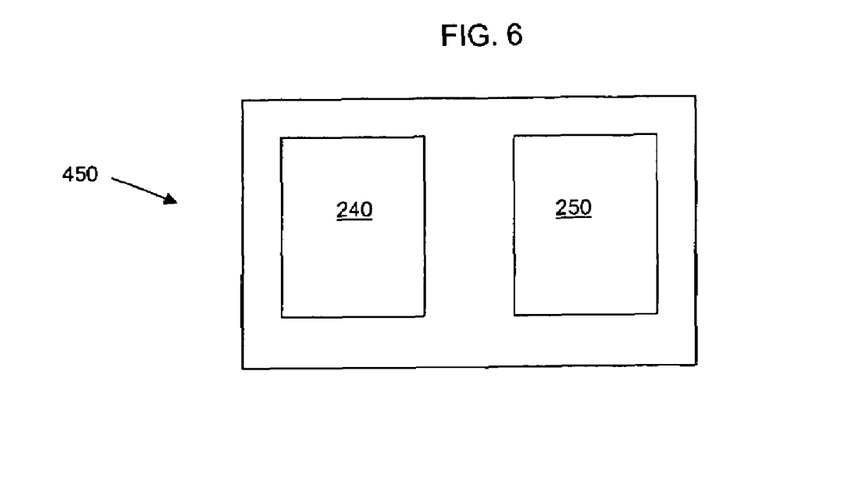
FIG. 6 is a schematic depiction of a data transfer media of the system.

The system 300 can include a globally connected system 335 and a disconnected system 400. Both systems 335 and 400 are desirably at a client site 310. Generally, the globally connected system 335 includes the remedy and patch server 340, a master local patch server 345, at least one local remedy server 360, at least one local patch server 370, and a local computer system 380, which generally includes at least one computer 382. The master local patch server 345 may be the primary disseminator of the global patch package 240 to the other local patch servers. The remedy and patch server 340 can communicate directly via a connection with the master local patch server 345 and the at least one local remedy server 360 to provide, respectively, the global patch package 240 and the global remedy package 250. Moreover, as depicted, the server 340 can include a mechanism, e.g. a CD burner, to download the patches and remedies onto a data transfer media or a means for physically transferring data 450 as also depicted in FIG. 6, e.g. a CD, which may then be loaded, respectively, onto the master local patch server 345 and the at least one local remedy server 360. Typically, the media 450 will include the global patch package 240 and the global remedy package 250. Desirably, the server 340 can create ISO files that are burned to either DVD or CD-R/RW media using built-in DVD/CD-RW drive or for download for electronic distribution.

In addition, at least one local patch server 370 communicates with the master local patch server 345, preferably by a LAN connection to, in turn, communicate with a local computer system 380, which can include at least one computer 382. It should be understood that these network connections may also be wireless, as long as the connection provides sufficient access between servers 340, 360, 345, and 370.

The system 400 is a secured system generally physically isolated by, e.g. "an air gap", from outside systems that have access, e.g. to the Internet 170. Alternatively, a real-time switch architecture can be utilized. Generally, a real-time switch shuttles between systems 300 and 400 to transfer data and is physically connected to only one of the systems 300 and 400 at a time. As a part of the switch certain protocols might be followed such as running virus scans, malware scans, as well as possibly a full reboot after disconnecting from the internet before being connected to the secure environment. Such secured systems are often desired in financial and government institutions to prevent the inadvertent transfer of sensitive data or the unwanted intrusion by hackers. The data transfer media 450 can transfer patches and remedies from the remedy and patch server 340 to, respectively, a master local patch server 470 and at least one second local remedy server 420. The master local patch server 470 can communicate patches to at least one local patch server 430, which in turn can communicate with a second local computer system 440, which is secured. Likewise, the at least one server 420 communicates remedies via a connection to the secured local system 440.

Figure 4:
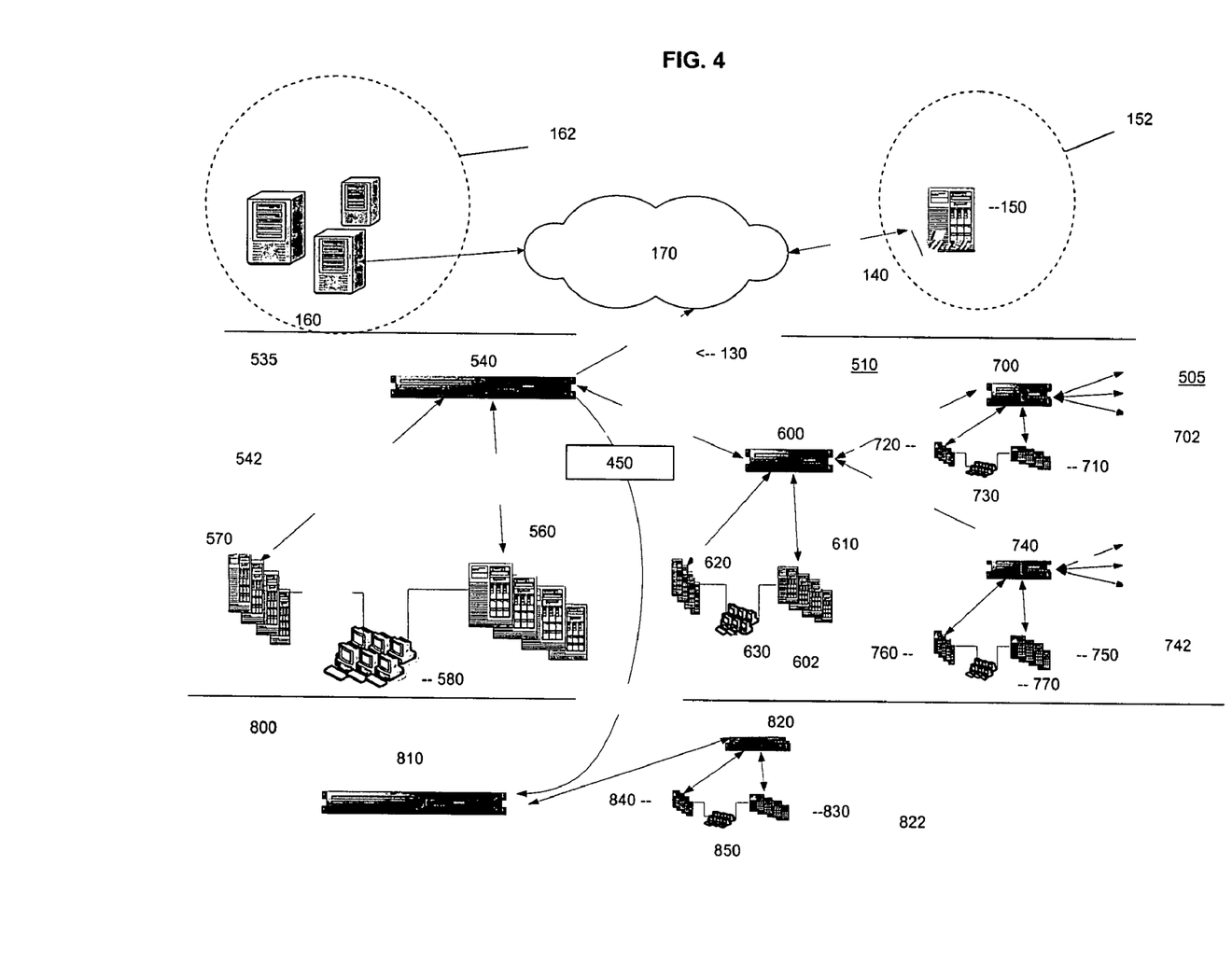
FIG. 4 is a schematic depiction of a still further exemplary embodiment of a system for protecting a computer network.

As depicted in FIG. 4, a further system 500 can include a globally connected system 535 and a disconnected system 800. The globally connected system 535 can form a computer network 505 and include a first-tier remedy and patch server 540 and its circuit of devices 542, a second-tier remedy and patch server 600 and its circuit of devices 602, a first third-tier remedy and patch server 700 and its circuit of devices 702 and a second third-tier remedy and patch server 740 and its circuit of devices 742. The first-tier server 540 is connected to servers 150 and 160 to obtain information outside a client site 510, as described above.

Each remedy and patch server can be in communication with a circuit of devices, such as at least one local remedy server, and at least one local patch server or master local patch server. In this exemplary embodiment, a first-tier remedy and patch server 540 can communicate with at least one first-tier local remedy server 560 and at least one first-tier local patch server 570, where each server 560 and 570 can in turn communicate with a first-tier local computer system 580. The second-tier remedy and patch server 600 can communicate with at least one second-tier local remedy server 610 and at least one second-tier local patch server 620, where each server 610 and 620 can in turn communicate with a second-tier local computer system 630. The first third-tier remedy and patch server 700 can communicate with at least one first third-tier local remedy server 710 and at least one first third-tier local patch server 720, where each server 710 and 720 can in turn communicate with a first third-tier local computer system 730. The second third-tier remedy and patch server 740 can communicate with at least one second third-tier local remedy server 750 and at least one second third-tier local patch server 760, where each server 750 and 760 can, in turn, communicate with a second third-tier local computer system 770. Optionally, the servers 700 and 740 can communicate with additional tiers (e.g., $4^{th}$, $5^{th}$, etc.) of remedy and patch servers, if, e.g., an organization is of sufficient size to require more tiers. Thus, the system 500 can be adaptable to organizations of various sizes.

The servers 540, 600, 700 and 740 and other associated devices share a common communications line or wireless link, e.g. local area network (LAN) that permits direct or indirect communication among them. Thus, the system 535 is not secured, but allows direct or indirect communication to the Internet 170.

An exemplary disconnected or secured system 800 can include a second or secured first-tier remedy and patch server 810 and a second-tier secured remedy and patch server 820. The second-tier secured remedy and patch server 820 can communicate with a circuit of devices 822, such as at least one second-tier secured local remedy server 830 and at least one second-tier secured local patch server 840, which in turn communicate with a second-tier secured local computer system 850.

The servers 540, 600, 700 and 740 are adapted to be in a mirrored configuration where information on one server is replicated or mirrored onto the next server in the chain for distribution throughout the system 500. Desirably, all mirrored connections between servers are fully encrypted, using, e.g., encrypted SSH connections from SSH Communications Security Ltd. of Wellesley, Mass. This mirrored configuration throughout the network 505 of the client can support different networked sites and network configurations. In one desired embodiment, only global data, e.g. the global patch package 240 and the global remedy package 250, is mirrored or replicated between the connected remedy and patch servers, while data in the custom repository 260 is not. Alternatively, the repository data 260 can be included, if, e.g., it is desirable to distribute locally generated data, such as testing approval data 262 or prioritization data 266, through the system 500.

In one desired version, the local remedy server can be subsequently scheduled to mirror the adjacent remedy and patch server to obtain timely updates. As an example, a global patch package 240 and a global remedy package 250 are received by the first-tier remedy and patch server 540 at a predetermined time. Afterwards, at a second predetermined time, the second-tier remedy and patch server 600 signals the first-tier remedy and patch server 540, and if the server 540 is accessible, the server 600 replicates packages 240 and 250 onto its device for distribution through devices in its circuit 602. Then, at a third predetermined time, the third-tier remedy and patch servers 700 and 740 send a signal to the second-tier server 600 to gain access to replicate the packages 240 and 250 stored on their respective devices for distribution through their respective circuits 702 and 742. As an example, these predetermined times can be separated by hour increments to permit sufficient time for a server to replicate data without interference from a replication request from a subsequent server. Moreover, such a one hour increment can be sufficiently brief to permit the relatively rapid replication of the packages 240 and 250 throughout the system 500. Optionally each remedy and patch server has the ability to limit the server that is permitted to retrieve patches or to perform administrative functions on the system 500. Furthermore, if this functionality is desired, each remedy and patch server can be configured with an internet protocol access list constraints to prohibit access to any remedy and patch server unless the internet protocol address is specifically allowed.

Other data, such as testing approval data 262 and prioritization data 266, contained on the first-tier remedy and patch server 540, can be copied onto at least one of the servers 600, 700, and 740 for distribution. Also, reporting services in the system 500 can review the activities of multiple remedy and patch servers from a single reporting point.

In one preferred embodiment, mirroring can occur on demand. As an example, once at least one of a global patch package 240 and a global remedy package 250 are received by the first-tier remedy and patch server 540, a signal can be sent from the server 540 to the second-tier server 600, for the server 600 to copy packages 240 and 250. Similarly, a signal from second-tier server 600 to the third-tier servers 700 and 740 can be sent to initiate copying of the new packages. Alternatively, the lower-tiered servers, i.e. second-tier server 600 and third-tiered servers 700 and 740 can send a signal upward to the next higher lever server, e.g. first-tier or second-tier server, to check for an updated packages 240 and 250 for copying onto their respective devices, and subsequently send signals to adjacent remedy and patch servers in their chain of communication for initiating copying of the new information.

In the secured system 800, the global patch package 240 and global remedy package 250 can be replicated or mirrored from the server 540 onto the data transfer media 450 for transfer onto the server 810. This transfer can occur on a schedule or by demand, as discussed above, except instead of a network connection, the data is transferred to the media 450 for bridging the "air gap" between the systems 535 and 800. Afterwards, data can be transferred from the second remedy and patch server 810 to the second-tier secured remedy and patch server 820, similarly to the tiered architecture as discussed above.

In an alternative embodiment, the tiered architecture can be dynamic. As an example, a subservient remedy and patch server can be re-designated as the first-tier server with an Internet access to remedies and patches. The other remedy and patch servers in the chain of communication can subsequently be re-designated to reflect the new hierarchy of servers, e.g. a second-tier server becomes a first-tier server and the first- and third-tier servers become second-tier. Thus, this tiered architecture not only automates the process for transferring updated remedy and patch data, thus eliminating much of the need for the manual copying of data onto transferable media, but also allows the transference of data across a secured boundary between systems by providing a server with, e.g., a CD or a DVD burner, to replicate data onto a data transfer media 450, which can be subsequently inserted into a server in a secured system for transferring the data to that secured server.

It should also be understood that the system is flexible and can include other configurations. As an example, the remedy and patch server, local remedy server, and local patch server can be combined into a single server for receiving data included on the storage unit 230. In such an instance, this single server can have an internet connection for retrieving remedies and patches from, respectively, the secondary provider server and the primary provider server. Other servers can communicate directly with the local computer systems and be adapted to be in a mirrored configuration either by a schedule or demand with the internet connected server. Thus, remedy and patch data can be replicated from server to server, and then to the local computer system.

Figure 7:
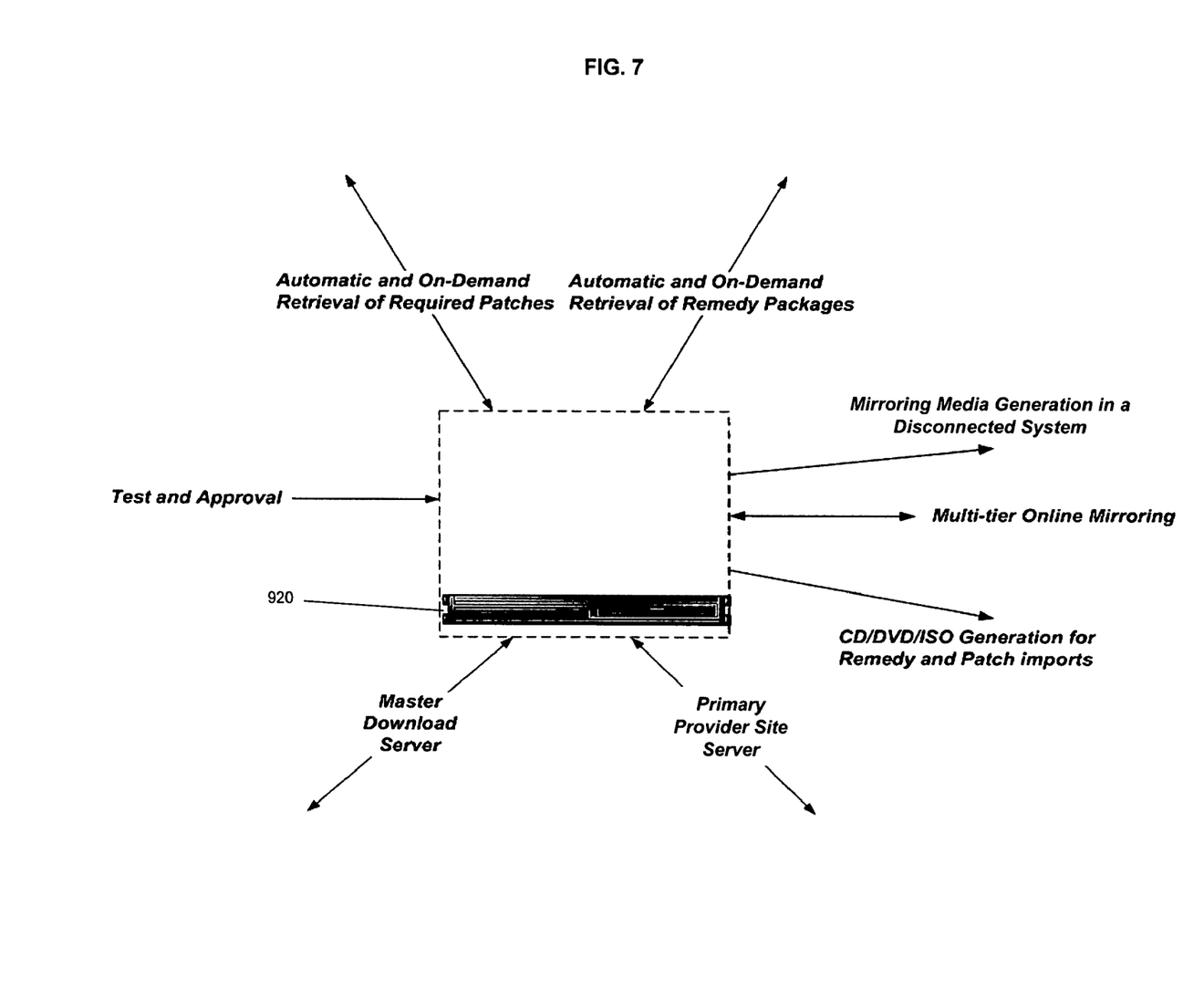
FIG. 7 is a schematic depiction of functional attributes of an exemplary remedy and patch server.

An exemplary remedy and patch server 920 is depicted in FIG. 7, which may be used in one or more of the systems described above. This server 920 can communicate with other devices and includes one or more functions. These communications can be two-way, receive only, or send only with respect to the other devices. As an example, the remedy and patch server can communicate two ways for automatic and/or on-demand retrieval of required patches from a secondary provider(s) and remedy packages from the primary provider. As discussed previously, the remedy and patch server 920 may communicate with other parallel remedy and patch servers to provide multi-tier online mirroring. Similarly offline mirroring with parallel servers in disconnected environments may be accomplished by generating media storing the mirrored content and transferring it to the disconnected servers. The remedy and patch server will typically exchange communications with a master download server (also referred to herein as a local patch server) and a primary provider site server (also referred to herein as a local remedy server) for disseminating patches and/or remedies at a client site, as described above. In some instances, prior to distributing remedies and/or patches to the local patch server(s) or local remedy server(s) or in some instances even to subordinate or parallel patch and remedy servers, the enterprise may require testing and subsequent approval to be provided to the remedy and patch server to authorize such distribution. Finally, the patch and remedy server 920 may in some environments generate CD/DVD/ISO files for distribution to the local patch server(s) or local remedy server(s), or in some instances even to subordinate or parallel patch and remedy servers, of remedy and patch imports. The remedy and patch servers described above can include one or more of these functions.

Figure 8:
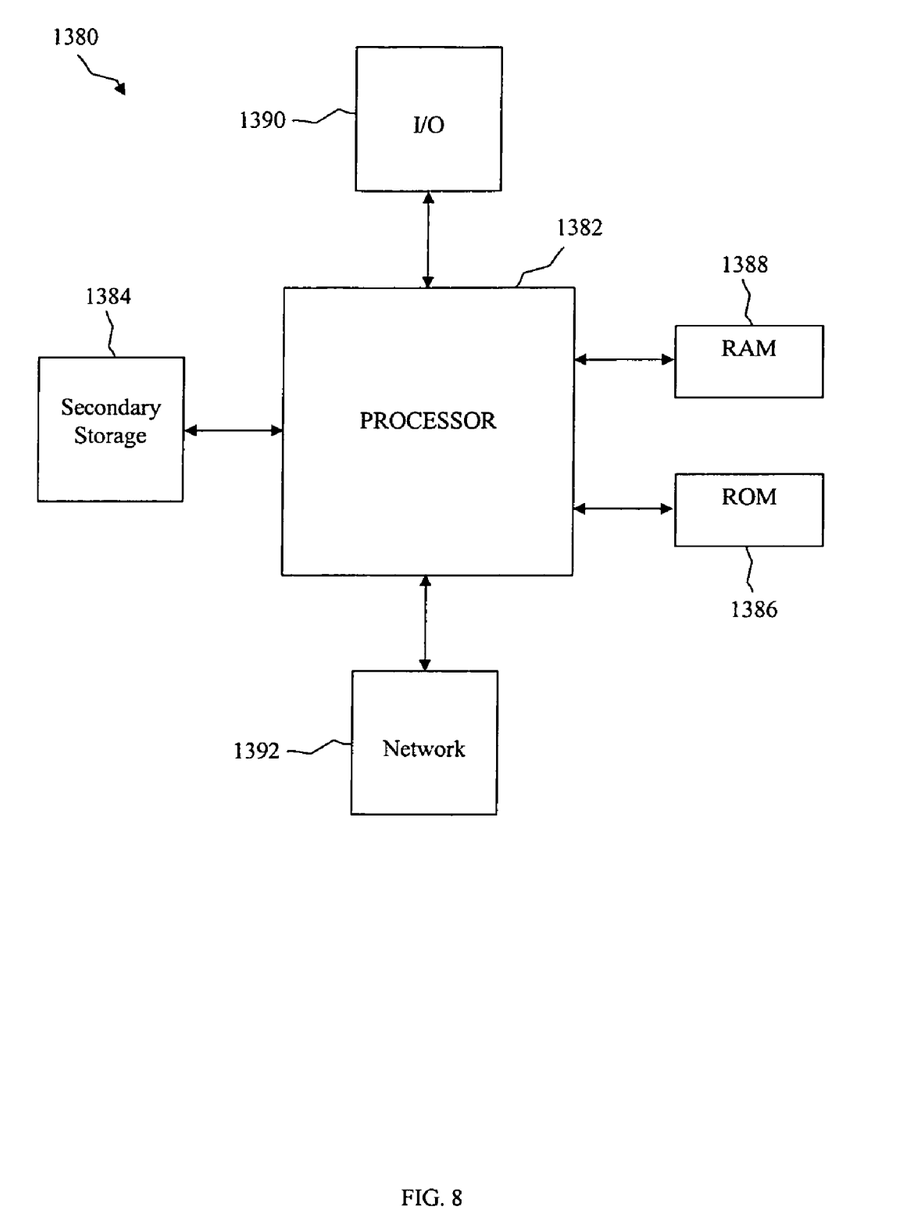
FIG. 8 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 1380 includes a processor 1382 (which may be referred to as a central processor unit or CPU) that is in communication with memory devices including the secondary storage 1384, read only memory (ROM) 1386, random access memory (RAM) 1388, input/output (I/O) 1390 devices, and network connectivity devices 1392. The processor may be implemented as one or more CPU chips.

The secondary storage 1384 is typically comprised of one or more disk drives, CD or DVD burners, or tape drives and is used for non-volatile storage of data and as an over-flow data storage device if the RAM 1388 is not large enough to hold all working data. In some instances, the disk drives may be in a RAD configuration. The secondary storage 1384 may be used to store programs which are loaded into the RAM 1388 when such programs are selected for execution. The ROM 1386 is used to store instructions and perhaps data which are read during program execution. The ROM 1386 is a non-volatile memory device which typically has a small memory capacity relative to the larger memory capacity of secondary storage. The RAM 1388 is used to store volatile data and perhaps to store instructions. Access to both the ROM 1386 and RAM 1388 is typically faster than to the secondary storage 1384.

The I/O 1390 devices may include printers, video monitors, liquid crystal displays (LCDs), touch screen displays, keyboards, keypads, switches, dials, mice, track balls, voice recognizers, card readers, paper tape readers, or other well-known input/output devices. The network connectivity devices 1392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 1392 devices may enable the processor 1382 to communicate with an Internet or one or more intranets. With such a network connection, it is contemplated that the processor 1382 might receive information from the network, or might output information to the network in the course of performing the above-described method steps. Such information, which is often represented as a sequence of instructions to be executed using the processor 1382, may be received from and outputted to the network, for example, in the form of a computer data signal embodied in a carrier wave.

Such information, which may include data or instructions to be executed using the processor 1382 for example, may be received from and outputted to the network, for example, in the form of a computer data baseband signal or signal embodied in a carrier wave. The baseband signal or signal embodied in the carrier wave generated by the network connectivity 1392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1382 executes instructions, codes, computer programs, scripts which it accesses from hard disk, floppy disk, optical disk (these various disk based systems may all be considered secondary storage 1384), the ROM 1386, the RAM 1388, or the network connectivity devices 1392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising:
a remedy and patch hardware server located at a client site and adapted to receive a global remedy package from a primary provider comprising at least one remedy and a global patch package from a secondary provider comprising at least one patch, wherein at least one remedy and optionally at least one patch can repair a vulnerability in a computer network;
at least one local remedy hardware server separate from the remedy and patch hardware server, the at least one local remedy hardware server adapted to communicate with the remedy and patch hardware server for receiving at least one remedy, wherein the at least one local remedy hardware server is provided by the primary provider of the global remedy package;
at least one local patch hardware server separate from the remedy and patch hardware server and the at least one local remedy hardware server, the at least one local patch hardware server adapted to communicate with the remedy and patch hardware server to receive at least one patch;
a local computer hardware system adapted to communicate, independently, with the at least one local remedy hardware server and at least one local patch hardware server for receiving, respectively, at least one remedy and optionally at least one patch;
a globally connected system comprising the remedy and patch hardware server, the at least one local remedy hardware server, the at least one local patch hardware server, and the local computer system;
a disconnected system at the client site comprising a second remedy and patch server, at least one second local remedy server and at least one second local patch server, wherein each of the at least one second local remedy server and at least one second local patch server communicates, independently, with a second local computer system; and
the remedy and patch hardware server in the globally connected system being adapted to transfer at least one of the global remedy package and the global patch package on a data transfer media, and the at least one disconnected local remedy server and at least one disconnected local patch server being adapted to receive at least a portion of data from the data transfer media.

2. The system according to claim 1, wherein the system further comprises a second-tier remedy and patch server, which is adaptable to be in a mirrored configuration with the remedy and patch hardware server.

3. The system according to claim 1, wherein one of the local patch hardware servers in the globally connected system is a master local patch server.

4. The system according to claim 1, wherein one of the local patch servers in the disconnected system is a master local patch server.

5. The system according to claim 1, wherein the globally connected system further comprises a second-tier remedy and patch server, which is adaptable to be in a mirrored configuration with the remedy and patch hardware server in the globally connected system.

6. The system according to claim 5, wherein the globally connected system further comprises a third-tier remedy and patch server, which is adaptable to be in a mirrored configuration with the second-tier remedy and patch server.

7. The system according to claim 5, wherein the tiered configuration of the remedy and patch servers can be altered.

8. The system according to claim 5, wherein the mirrored configuration of the tiered remedy and patch servers are initiated on a predetermined schedule.

9. The system according to claim 5, wherein the mirrored configuration of the tiered remedy and patch servers are initiated on demand.

10. The system according to claim 1, wherein the disconnected system further comprises a second-tier remedy and patch server, at least one second-tier local remedy server, and at least one second-tier local patch server, wherein the second-tier remedy and patch server is adaptable to be in a mirrored configuration with the second remedy and patch server in the disconnected system.

11. A system, comprising:
a first server comprising a storage unit at a client site and in communication with a local computer system, wherein the storage unit comprises:
a remedy repository for receiving data from a global remedy package, in turn, comprising at least one remedy to repair a vulnerability in a computer network and obtained via the Internet from a primary provider;
a patch repository for receiving data from a global patch package, in turn, comprising at least one patch to repair a vulnerability in the computer network and obtained via the Internet from at least one secondary provider, wherein the packages are requested at the client site for transfer of at least one remedy and optionally at least one patch to the local computer system to repair a vulnerability;
a custom repository comprising prioritization data and testing approval data originating from within the client site;
wherein the client site is operable to receive the at least one remedy from the first server via a local remedy server separate from the first server and is further operable to optionally receive the at least one patch from the first server via a local patch server separate from the first server and the local remedy server;
wherein the local remedy server is provided by the primary provider of the global remedy package;
wherein a globally connected system comprises the first server, the at least one local remedy server, the at least one local patch server, and the local computer system;
wherein a disconnected system at the client site comprises a second server, at least one second local remedy server and at least one second local patch server, wherein each of the at least one second local remedy server and at least one second local patch server communicates, independently, with a second local computer system;
wherein the first server in the globally connected system is adapted to transfer at least one of the global remedy package and the global patch package on a data transfer media, and the at least one disconnected local remedy server and at least one disconnected local patch server being adapted to receive at least a portion of the global remedy package and the global patch package from the data transfer media.

12. A system according to claim 11, further comprising a secured server disconnected from the computer network, the first server being adapted to replicate the global remedy package and the global patch package to the data transfer media, and the secured server being adapted to receive the global remedy package and the global patch package from the data transfer media.

13. A system according to claim 11, wherein the global remedy package comprises remedy data, patch validation data, and association data comprising a correlation of a remedy to at least one vulnerability, and optionally to one or more patches.

14. A method, comprising:
generating remedies at a primary provider to repair vulnerabilities in a computer network and combining the remedies into a global remedy package;
generating patches at a secondary provider to repair vulnerabilities in the computer network and combining the patches into a global patch package;
sending the global remedy package and the global patch package upon request by a client to a remedy and patch server wherein the global remedy package comprises remedy data, patch validation data, and association data of a remedy to at least one vulnerability;
disseminating the remedy package directly or indirectly to a local remedy server and the global patch package to a local patch sever after downloading to the remedy and patch server; and
disseminating the remedy package from the local remedy server to a local computer system and applying the remedy on the local computer system;
wherein the remedy and patch server, the local remedy server and the local patch server include separate servers;
wherein the local remedy server is provided by the primary provider of the global remedy package;
disseminating the remedy package directly or indirectly to the local remedy server on a system disconnected from the remedy and patch server and the global patch package to the local patch sever on the disconnected system after downloading to the remedy and patch server; and
disseminating the remedy package from the local remedy server to a local computer system on the disconnected system.

15. A method according to claim 14, further comprising archiving the patch data in the global patch package to the remedy and patch server after downloading.

16. A method according to claim 14, further comprising validating at least one patch against the patch validation data.

17. A method according to claim 14, wherein the association data further comprises data associating one or more patches to a vulnerability.

* * * * *